June 20, 1967          A. R. GAGNE          3,326,010

SLIT TRENCHING AND CABLE LAYING MACHINE

Filed Jan. 25, 1965          2 Sheets-Sheet 1

INVENTOR.
ARCHIE R. GAGNE

BY

ATTORNEY

United States Patent Office 3,326,010
Patented June 20, 1967

3,326,010
SLIT TRENCHING AND CABLE LAYING
MACHINE
Archie R. Gagne, 29W629 N. Aurora Road,
Naperville, Ill. 60540
Filed Jan. 25, 1965, Ser. No. 427,605
10 Claims. (Cl. 61—72.6)

ABSTRACT OF THE DISCLOSURE

A self propelled slit trenching and cable laying machine characterized by a cyclically oscillated plow blade constrained for elliptical movement at the bottom thereof and the plow blade having a serrated leading edge on the ground entrant portion to grip the soil upon upward movement thereof to cause downward movement of the chassis frame and consequent increased tractive effort of the tractive means therefor. A chassis frame for advancing the plow blade includes a pivotally connected, vertically adjustable lift frame on which the plow blade and oscillatory drive therefor are mounted, permitting lowering of the plow blade while it is being oscillated for laying cable close in a building foundation.

---

The improved cable laying plow according to the present invention is particularly adapted for use in the laying of buried telephone cable or the like. It is, however, capable of other uses, and plows constructed according to the principles of the present invention may, for example, by omission of the cable laying features and whatever other modification may be found desirable, be employed for producing slit trenches for soil and water conservation projects. Irrespective of the particular use to which the structure according to the present invention may be put, the essential features of the invention are at all times preserved.

Heretofore, in connection with the burying of service cables, the usual operations have included the digging of a trench and backfilling the same after the cable is laid therein, such operations being time consuming and relatively expensive, as well as being possessed of numerous functional limitations, the principal one being the unsightliness of the job site. Restoration of the ground surface above the buried cable presents a problem that cannot be immediately solved, as for example when it is necessary to plant grass seed in the backfill. The presence of roots and other submerged vegetation also adds to the difficulty of the trenching operation.

The structure according to the present invention is designed to overcome the above-noted limitations that are attendant upon the laying of buried cable by a wire trenching operation and, toward this end, the invention contemplates the provision of a novel cable-laying plow having a plowshare which progressively slits the earth along a longitudinal path where the cable is to be buried, and which at the same time progressively feeds a cable into the slit trench, the walls of the slit automatically closing upon the thus fed cable progressively as the plow travels forward. No appreciable amount of earth is elevated from the surface of the ground and, ordinarily, after the first succeeding rainstorm, the slot becomes fully closed with little evidence of its former existence. Insofar as the presence of roots or other submerged vegetation is concerned, the plow of the present invention is capable of cutting through all but the most stubborn obstacles.

There are in existence plows which are capable of progressively slitting the earth to produce slit-type trenches wherein very little earth is removed. Such plows are usually tractor pulled and the swaths cut thereby are relatively wide and are designed for a mulch fill in connection with water and soil conservation projects. The effort require to pull such plows is great, and the plows are not designed to cut through roots and similar obstructions, special and separate sawing devices being provided for this purpose. To lessen the power required to pull such plows, some of them are provided with means for effecting vertical reciprocation of the plowshares but even when this expedient is resorted to, the vehicles which constitute the plows are incapable of being efficiently self-propelled due to the inability to attain proper ground traction and, as a consequence, they generally must be tractor drawn.

The present invention is designed to overcome the above noted limitations attendant upon the construction and operation of plows of the type capable of producing slit trenches and, toward this end, the invention contemplates the provision of a novel self-propelled plow having associated therewith a relatively thin, blade-like oscillatable plowshare which, when in operation, has an essentially circular orbital movement.

Another and important advantage offered by the provision of the essentially circular motion of the plowshare is that such motion tends to operate through the vehicle frame to pull the traction wheels of the vehicle downwardly and thus increase the traction which is attained when driving the plow vehicle forwardly, at the same time such movement of the plowshare providing a sawing effect thereof through the soil, the sawing effect readily removing roots, small stones and the like. The forward component of movement of the plowshare, coupled with the tractive effort of the driving wheels provides good action of the share in going through the soil.

The provision of a plow of the character briefly outlined above, and possessing the stated advantages, being among the principal objects of the invention, it is a further object to provide such a plow wherein the plowshare is provided with a rigidly attached cable guiding tube or channel, the tube moving bodily with the plowshare during oscillation thereof so that the cable is agitated during feeding thereof into the slit trench, thus continuously freeing the cable for feeding purposes and precluding the possibility of binding of the cable within the tube.

Another object of the invention is to provide a novel eccentric and rocker mechanism for effecting the above-described essentially circular motion of the plowshare, the system being comprised of relatively few parts and therefore being unlikely to get out of order.

Numerous other objects and advantages of the invention, not at this time enumerated, will readily become apparent as the following description ensues.

In the accompanying two sheets of drawings forming a part of this specification, one illustrative embodiment of the invention has been shown.

In the drawings:

FIG. 3 is an enlarged sectional view taken substantially on the line 3—3 of FIG. 2; and FIG. 4 is a diagrammatic view illustrating certain geometrical considerations associated with the oscillatory movement of the plowshare of the present invention.

Figure 1:
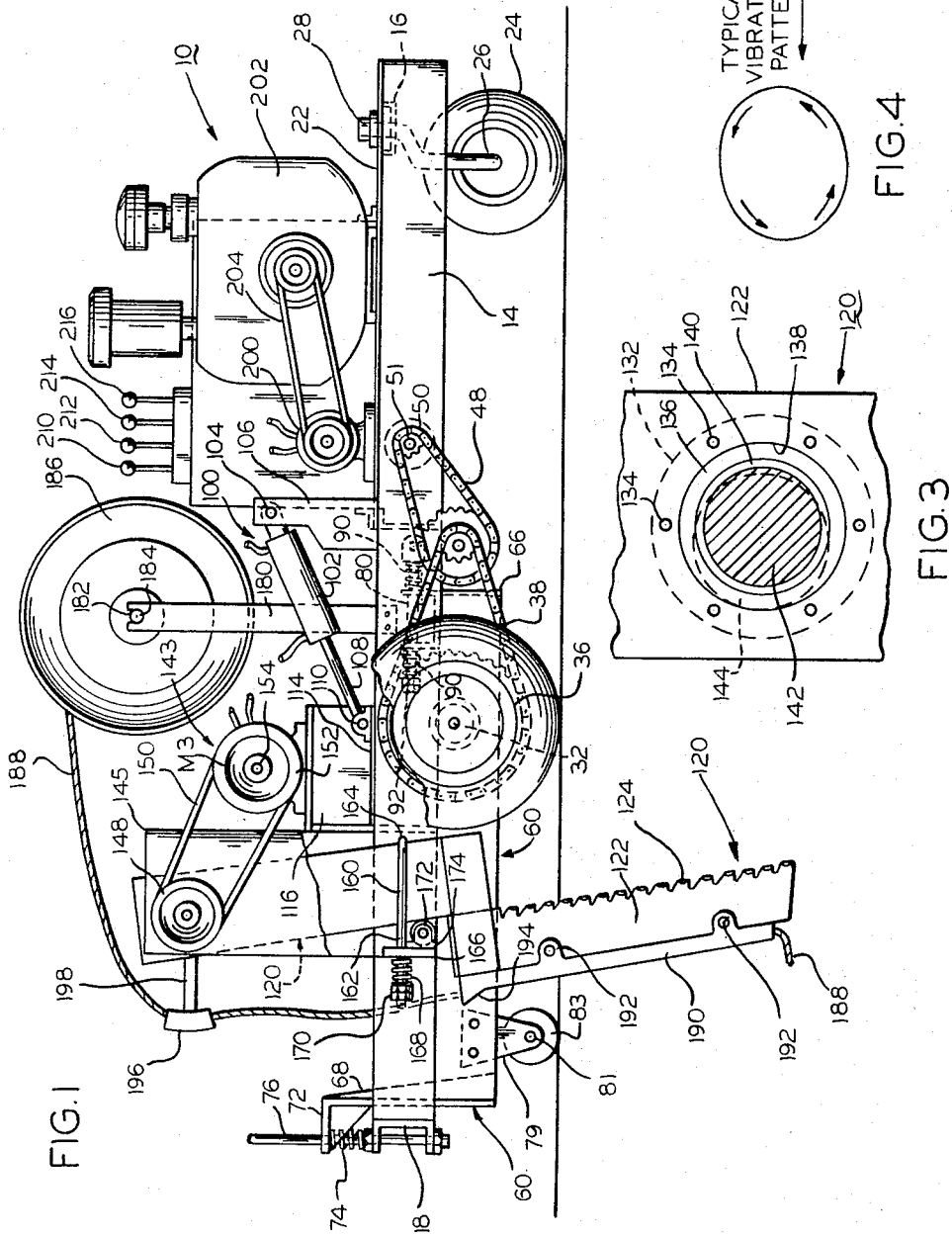
FIG. 1 is a side elevational view of a cable-laying plow constructed according to the principles of the present invention and showing the same in operation.
Figure 2:
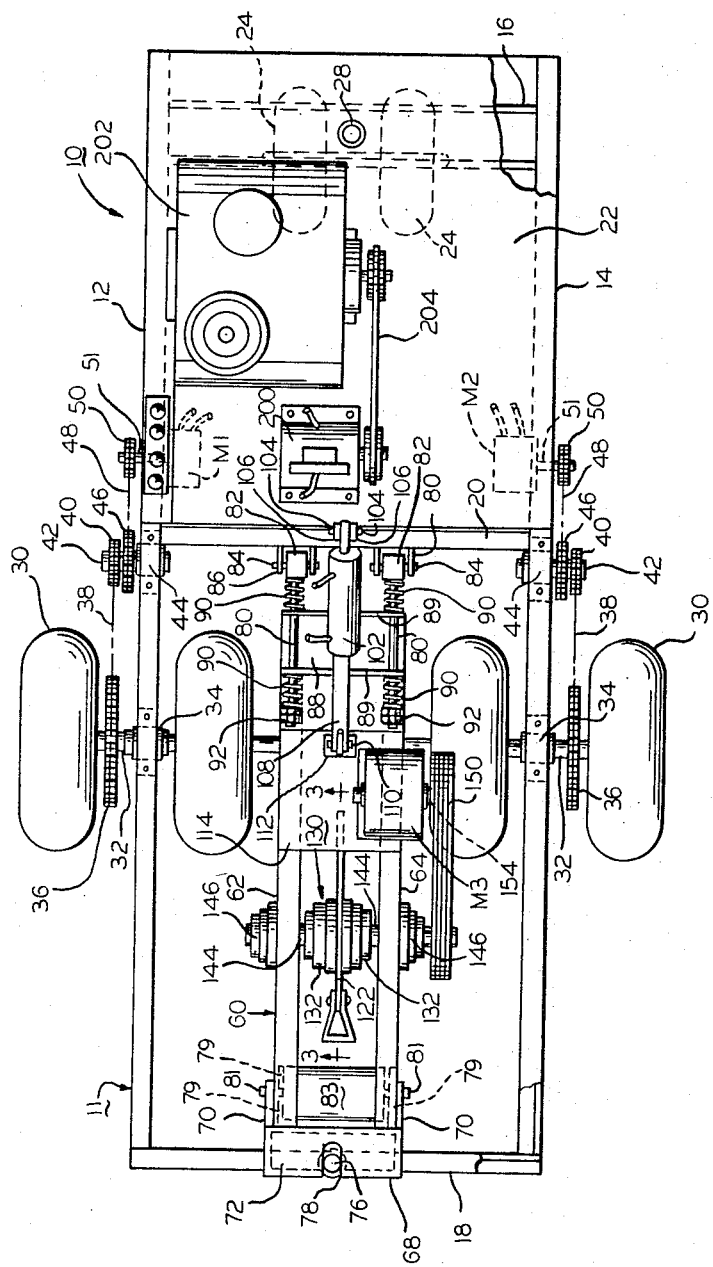
FIG. 2 is a plan view of the plow with the cable-supply drum removed in the interests of clarity.

Referring now to the drawings in detail and in particular to FIGS. 1 and 2, the cable laying plow embodying the principles of the present invention is designated by the reference numeral 10. The plow 10 is in the form of a self-propelled vehicle including a rectangular shaped main chassis frame 11 having longitudinally extending side frame members 12 and 14, a front transverse frame member 16, a rear transverse frame member 18, and an intermediate transverse frame member 20. The side frame members 12 and 14 are in the form of inwardly presented lengths of channel stock. A platform 22 extends between and is supported on the side members 12 and 14 and extends substantially from the intermediate frame member 20 to the extreme forward end of the chassis frame 11.

The forward end of the chassis frame 11 is supported upon a dual wheel caster arrangement including caster wheels 24 supported upon a forked caster spindle 26, the upper end of which passes upwardly through the front transverse frame member 16 and platform 22, and is secured in position thereto by a set collar 28. The caster arangement is of the free floating type.

The plow chassis frame is supported in its medial regions by two pairs of independently driven dual wheel assemblies each of which includes a pair of wheels 30 carried on an axle 32 journalled in a roller bearing assembly 34 bolted or otherwise secured to the underneath side of one of the side frame members 12 or 14 as the case may be. The wheels 30 of each pair straddle its adjacent side member and the associated axle 32 is fast to a sprocket 36 which is connected by a sprocket chain 38 to a relatively small sprocket 40 fast on an idler shaft 42 rotatable in bearings 44 secured to the underneath side of the adjacent side member 12 or 14 as the case may be. A second and larger sprocket 46 is fast on the idler shaft 42, and is connected by a sprocket chain 48 to a drive sprocket 50 fast on the drive shaft 51 of an hydraulic drive motor which is suitably supported on the adjacent side member. The motor on side frame member 12 which drives wheels 30 thereat is designated M1, and the motor on the side member 14 which drives the other pair of wheels 30 is designated M2. Independent motors for each pair of wheels are provided for vehicle steering purposes as will be described in greater detail presently.

Still referring to FIGS. 1 and 2, a free floating lift frame 60 is effectively pivoted to intermediate frame member 20, and is movable between a lowered position wherein it is shown in full lines and a raised position, not shown. Lift frame 60 is generally of elongated narrow rectangular configuration, and includes a pair of side frame members 62 and 64, a front transverse frame member 66 and a rear transverse frame member 68. Rear transverse frame member 68 is in the form of a bracket having side flanges 70 which straddle the side members 62 and 64, and which project upwardly thereabove to carry at their upper ends a horizontal supporting plate 72. In the lowered position of the lift frame 60 the supporting plate 72 rests upon and is supported by the upper end of a compression spring 74 guided by a vertical pilot post 76 projecting upwardly from the rear transverse frame member 18. In the lowered position of the lift frame 60, the latter assumes a horizontal position and it is disposed slightly below the level of the chassis frame 11 as clearly shown in FIG. 1. The supporting plate 72 is formed with a notch or recess 78 medially of its rear edge, this notch constituting a clearance by means of which the pilot post 76 may project upwardly through the plate 72 when the lift frame 60 is in its lowered position.

A pair of generally triangular side plates 79 are secured to the side members 62 and 64 and serve to support therebetween a shaft 81 carrying a tamping roller 83, the nature and function of which will be described subsequently.

The forward end of the lift frame 60 is effectively pivoted to the intermediate transverse member 20 by a floating pivot connection including a pair of guide rods 80, the proximate ends of which are provided with enlarged heads 82 pivoted on pins 84 supported in brackets 86 secured to the intermediate transverse member 20. The extreme forward end of the lift frame 60 carries channel 88 with legs 89 thereof extending upward, and the two guide rods 80 pass through the vertical legs 89, channel 88 being longitudinally slidable upon the rods 80. Centering springs 90 encompass the opposite end regions of the guide rods 80 and bear against the legs 89 of channel 88, the forward springs 90 bearing against the enlarged heads 82, and the rear springs 90 bearing against lock nut assemblies 92 received on the extreme rear ends of the guide rods 80.

From the above description it will be seen that the lift frame 60, being fixedly secured to the sliding bracket, is floatingly mounted on the two guide pins 80 and is held by the springs 90 in a centered position wherein the notch 78 provided in the supporting plate 72 is in register with and encompasses the pilot pin 76 when the lift frame 60 is in its lowered position. When the lift frame is in its inclined elevated position, the gravitational weight of the latter compresses the two forward springs 90 and the entire lift frame slides forwardly and downwardly on the guide pins 80.

Movement of the lift frame 60 between its lowered horizontal position and its raised inclined position is effected under the control of an hydraulic fluid cylinder and plunger assembly 100 including a lift cylinder 102, the upper end of which is pivoted on a cross pin 104 extending between a pair of upstanding spaced plates 106 secured to the intermediate transverse frame member 20 of chassis frame 11. Lift cylinder 102 has a piston rod 108, the lower end of which is pivoted at 110 to a bracket 112 mounted on an elevated box-like platform 114 extending transversely between and is supported on the side members 12 and 14.

A box-like motor mount 116 is supported on the platform 114 and serves to support an hydraulic motor M3 which provides oscillatory motion for a plowshare 120 carried by the lift frame 60 in a manner that will now be described.

The plowshare 120 is of thin blade-like design and it is supported on the lift frame 60 substantially centrally thereof in a vertical position. The plowshare is in the form of a vertically elongated, narrow steel plate, the forward edge thereof in the lower regions of the plowshare being tapered or sharpened as indicated at 122. This tapered portion or "shin" 122 is provided with a series of cutting teeth 124.

The plowshare 120 is supported near its upper end in an eccentric bearing assembly 130 which is preferably of the sealed roller type. The bearing assembly is provided with a split housing, the two sections 132 of which are bolted as at 134 to the opposite sides of the plowshare 120. As best seen in FIG. 3, the outer race 136 of the assembly 130 is seated within a circular opening or hole 138 provided in the plowshare 120 while the inner race 140 surrounds an eccentric 142 formed on a transverse supporting shaft 144 which has its ends mounted in bearings 146 carried in spaced vertical extensions 145 from the side frame members 62 and 64. One end of the shaft 144 carries a V-belt pulley 148 which is connected in driven relationship by a multiple strand V-belt 150 to a driving V-belt pulley 152 mounted on output shaft 154 of the previously mentioned hydraulic motor M3.

The approximate medial portions of the plowshare 120 is yieldingly biased in a rearward direction by means of a U-clamp 160, the legs 162 of which straddle the plowshare 120 and the bight portion 164 of which engages the forward edge thereof. The clamp legs 162 are movable with respect to an abutment 166 extending between the spaced vertical frame extensions 145 and at the lower rearward edges thereof, and clamp 160 is yieldingly biased in a rear direction by means of compression springs 168 interposed between abutments 166 and locknut assemblies 170 carried on the rear ends of the clamp legs 162. U-clamp 160 and springs 168 serve to bias the plowshare 120 against a guide roller 172 carried in a bracket 174 mounted on the front side of abutment 166.

From the description thus it will be observed that upon actuation of the hydraulic motor M3, and consequent rotation of the eccentric supporting shaft 144, an oscillatory motion will be imparted bodily to the plowshare 120. This oscillatory motion provides an orbital path of movement as seen in FIG. 4 to the lower end of the plowshare 120, the motion thereat being substantially elliptical with but small differences between the major and minor axes of such elliptical path of movement.

A pair of side supports or standards 180 project upwardly from the side members 12 and 14, and have their upper ends notched as at 182 for reception therein of a supporting spindle 184 for a cable reel or drum 186. The cable 188 which is to be buried is adapted to be fed from the drum 186, from whence it passes through a guide channel 190 having attachment ears 192 by means of which it is secured to the rear or trailing edge region of the plowshare 120. The upper end of the guide channel 190 is preferably flared as at 194 to facilitate entry of the cable into the channel. The lower end of the channel 190 terminates adjacent the lower end of the plowshare 120. A short guide tube 196 is carried at the distal end of an arm 198 secured to the plowshare 120 and serves to align the cable 188 with the flared end 194 of the guide channel.

The hydraulic motors M1 and M2 which serve to drive the traction wheels 30, the hydraulic motor M3 which initiates oscillation of the plowshare 120, and the piston and plunger assembly 102 which raises and lowers the lift frame 60 are all served by a common hydraulic pump 200 mounted on the platform 22. The pump 200 is driven by an internal combustion engine 202 by a belt and pulley arrangement 204.

The operation of the cable-laying plow 10 is achieved by the supply of hydraulic motive fluid for actuating the three motors M1, M2 and M3, as well as the lift cylinder 102 from the common pump 200. Details of hydraulic circuitry for such purpose are not shown as they are within the skill of one in the art. Thus, when the internal combustion engine 202 is in operation, fluid is available at the outlet side of the pump 200 for selective actuation of the three motors and lift cylinder.

Lift cylinder 102 and the motors M1, M2 and M3 are, however, under the control of handles 210, 212, 214 and 216 respectively, connected into such hydraulic circuitry. Assuming now that cable laying operations are to be undertaken, the lift frame 60 is first lowered to the horizontal full line position thereof seen in FIG. 1. This is accomplished by actuating control handle 210 in such a manner that fluid under pressure is supplied to the upper end of the cylinder 102 from the discharge side of the pump 200. Lowering of the lift frame 60 is preferably accompanied by oscillation of the plowshare 120, in which case control handle 216 will be actuated so that a fluid circuit will extend through the motor M3. When the motor M3 is not in operation, the control handle 216 is actuated to by-pass motor M3.

If the lift frame 60 is lowered during vibration of the plowshare 120 as described above, it will work its way into the ground under the influence of the vibrating motion of the plowshare 120.

After the plowshare 120 has penetrated the ground to the depth permitted by the lift frame 60, forward motion is imparted to the plow vehicle. The traction drive of the vehicle is accomplished by actuating the control handles 212 and 214, handle 212 controlling the drive of the wheels 30 at side frame 12, and handle 214 controlling the drive of the wheels 30 at side frame 14. The control handles 212 and 214 are part of reversing valves, not shown, for wheel-driving purposes, and they establish proper fluid working circuits through the motors M1 and M2.

Reversal of the motor M1 is accomplished by actuating the control handle 212 in an opposite direction, so that fluid flow is reversed through motor M1. The valves controlled by the operators shown may also be of the flow regulating type, so that the speed of the respective motors M1 and M2 and steering of the vehicle may be accomplished.

With the oscillation control motor M3 in operation, the plowshare 120 effectively embedded in the ground, and the wheels 30 having tractional driving engagement with the ground, very little traction is required to advance the vehicle since the oscillatory movement of the plowshare exerts a slicing and impact action to reduce plow drag to a minimum. Since the cable guide channel 190 is rigidly attached to the trailing edge of the plowshare 120, this channel is also subject to oscillatory motion which agitates the cable and allows the same to pass freely through the guide channel and into the slit trench which is created progressively by the plowshare shin 122 as it advances forwardly through the ground. The tamping roller 83 receives at least some vibratory motion from the floating lift frame 60 and, since it trails the plowshare 120, it serves to progressively close the slit trench opened by the plowshare.

The oscillatory path of movement of the lower regions of the plowshare during cable-laying operations constitutes an important feature of the present invention. This oscillation reduces the tractive effort required by the wheels 30 to drive the plow. Not only does such oscillatory motion create a slicing action upon the ground undergoing trenching, but also the fact that the direction of oscillation is in a counter-clockwise direction as viewed in FIG. 4 causes the teeth 124 to move upward as they encounter fresh compact earth, thus exerting a reaction force on the plow chassis tending to pull the wheels 30 downwardly into good tractional contact with the ground.

The invention is not to be limited to the exact arrangement of parts shown in the accompanying drawings or described in this specification as various changes in the details of construction may be resorted to without departing from the spirit of the invention. Therefore, only insofar as the invention has particularly been pointed out in the accompanying claims is the same to be limited.

Having thus described the invention, what I claim and desire to secure by Letters Patent is:

1. In a plow for progressively cutting a slit-type trench in soil, a chassis frame, supporting wheels for said frame, power means for supplying tractive effort to said wheels, shaft bearings carried by said frame, a shaft journalled in said bearings and having an eccentric cam thereon, a vertically disposed relatively thin blade-like plowshare having a bearing located near the upper end thereof for receiving said eccentric cam, said plowshare extending substantially vertically downwardly below the bearing and having its lower end region adapted to project into and progressively form a slit-type trench in the soil as the plow is propelled forwardly, confining means for the medial portions of said plowshare constraining the same during rotation of the eccentric cam whereby the lower end region of the plowshare is constrained to move in an elliptical path, and means for rotating said shaft, and a serrated forward edge on the lower end of said plowshare effective during upward movement of said plowshare to draw said chassis frame downwardly and to increase the tractive effort of said wheels.

2. In a plow for progressively cutting a slit-type trench in soil, a chassis frame, supporting wheels for said frame, power means for supplying tractive effort to said wheels, a lift frame pivoted at one end to said chassis frame and movable between lowered and raised positions, shaft bearings carried by said lift frame, a horizontal shaft journalled in said bearings and having an eccentric cam thereon, a vertically disposed relatively thin blade-like plowshare having a bearing located near the upper end thereof for receiving said eccentric cam, said plowshare extending substantially vertically downwardly below the bearing and having its lower end region adapted to project into and progressively form a slit-type trench in the soil as the plow is propelled forwardly, an abutment on said lift frame below the level of said eccentric cam and slidably engageable with the trailing edge of the medial portions of said plowshare to limit the extent of rearward movement of said medial portions during rotation of the cam, means on said lift frame providing a second abutment engageable with the leading edge of the medial portions of the plowshare for rearward movement whereby the lower end region of the plowshare is constrained to move in an elliptical path, and means for rotating the shaft, and serrations on the forward edge of said plowshare effective during upward movement of said plowshare to draw said chassis frame downwardly and increase the tractive effort of said wheels.

3. In a plow for progressively cutting a slit-type trench in soil, in combination: a chassis frame, supporting wheels for said frame, power means for supplying tractive effort to said wheels, a lift frame pivoted at one end to said chassis frame and movable between lowered and raised positions, shaft bearings carried by said lift frame, a horizontal shaft journalled in said bearings and having an eccentric thereon, a vertically disposed relatively thin blade-like plowshare having a bearing located near the upper end thereof for receiving said eccentric cam, said plowshare extending substantially vertically downwardly below the bearing and having its lower end region adapted to project into and progressively form a slit-type trench in the soil as the plow is propelled forwardly, an abutment on said lift frame below the level of said eccentric cam and slidably engageable with the tracting edge of the medial portions of said plowshare to limit the extent of rearward movement of said medial portions during rotation of the cam, spring means effective between the plowshare and lift frame yieldingly biasing the medial portions of the plowshare rearwardly against said abutment whereby the lower end region of the plowshare is constrained to move in an elliptical path, means for rotating said shaft, and serrations on the leading edge of the lower end of said plowshare effective during upward movement of said plowshare to draw said chassis frame downwardly and to increase the tractive effort of said wheels.

4. In a plow for progressively cutting a slit-type trench in soil, the combination set forth in claim 3 and wherein said spring means comprises a U-clamp, the legs of which straddle the medial portions of the plowshare, and a compression spring effective between the lift frame and each leg of the U-clamp for drawing the bight portion of the U-clamp hard against the leading edge of the medial portions of the plowshare.

5. In a self-propelled plow for progressively cutting a slit-type trench in soil, in combination: a chassis frame, tractional supporting and driving wheels for said frame, a lift frame pivoted at one end to said chassis frame and movable between lowered and raised positions, shaft bearings carried by said lift frame, a horizontal shaft journalled in said bearings and having an eccentric thereon, a substantially vertically disposed relatively thin blade-like plowshare having a bearing located near the upper end thereof for receiving said eccentric, said plowshare extending substantially vertically downwardly below the bearing and having its lower end region adapted to project into and progressively form a slit-type trench in the soil as the plow is propelled forwardly, an anti-friction roller on said lift frame below the level of said eccentric cam and slidably engageable with the trailing edge of the medial portions of said plowshare to limit the extent of rearward movement of said medial portions during rotation of the cam, spring means effective between the plowshare and lift frame yieldingly biasing the medial portions of the plowshare rearwardly against said roller whereby the lower end region of the plowshare is constrained to oscillate in an elliptical path, means for rotating said shaft, and power actuated means on said chassis frame for driving said tractional supporting wheels.

6. In a self-propelled plow for progressively cutting a slit-type trench in soil, the combination set forth in claim 5 and including a series of serrations on the leading edge of the plowshare effective during upward movement of the oscillating lower end of the plowshare to exert a reaction force through the plowshare, bearing, shaft, lift frame and chassis frame to said tractional supporting wheels tending to draw the latter downwardly and enhance the tractional characteristics thereof.

7. In a self-propelled cable-laying plow for progressively cutting a slit-type trench in soil and depositing a cable in the trench, in combination, a chassis frame, traction wheels supporting said frame, a lift frame pivoted at its forward end to a medial region of said chassis frame and movable between a lowered substantially horizontal position and a raised inclined position, shaft bearings carried by the lift frame, a horizontal shaft journalled in said bearings and having an eccentric thereon, a substantially vertically disposed relatively thin blade-like plowshare having a bearing located near the upper end thereof for receiving said eccentric, said plowshare extending substantially vertically downwardly below the bearing and having its lower end region adapted to project into and progressively form a slit-type trench in the soil as the plow is propelled tractionally forwardly, confining means for the medial portions of said plowshare constraining the same whereby the lower end region of the plowshare is constrained to move in an elliptical path, means for rotating said shaft, a cable-supporting reel rotatably mounted on said chassis frame, an elongated guide tube substantially coextensive with and secured to the trailing edge of said plowshare and oscillatable in unison with the latter for feeding cable issuing from the reel into the trench, and means for driving said traction wheels to propel the plow forwardly.

8. In a self-propelled cable-laying plow for progressively cutting a slit-type trench in soil and depositing a cable in the trench, the combination set forth in claim 7 including a compression spring effective between the rear end of the lift frame and chassis frame for floatingly supporting the rear end of the lift frame when the latter is in its lowered position.

9. In a self-propelled cable-laying plow for progressively cutting a slit-type trench in soil and depositing a cable in the trench, the combination set forth in claim 7 including a tamping roller secured to said lift frame and trailing said plowshare when the lift frame is in its lowered position.

10. In a self-propelled cable-laying plow for progressively cutting a slit-type trench in soil and depositing a cable in the trench, in combination: a chassis frame, a pair of traction wheels supporting said frame, a lift frame pivoted at its forward end to a medial region of said chassis frame and movable between a lowered substantially horizontal position and a raised inclined position, shaft bearings carried by the lift frame, a horizontal shaft journalled in said bearings and having an eccentric thereon, a substantially vertically disposed relatively thin blade-like plowshare having a bearing located near the upper end thereof for receiving said eccentric, said plowshare extending substantially vertically downward below the bearing and having its lower end region adapted to project into and progressively form a slit-type trench in the soil as the plow is propelled tractionally forwardly, confining means for the medial portions of said plowshare constraining the same whereby the lower end region of the plowshare is constrained to move in an elliptical path, a fluid motor supported on and movable bodily with the lift frame for rotating said shaft in a direction effective to cause movement of the lower end of the plowshare in an elliptical path, and an hydraulic cylinder and plunger assembly effective between the lift frame and chassis frame for raising and lowering the lift frame, a fluid motor for each traction wheel mounted on said chassis frame and operatively connected to the wheel in driving relationship, a pump on said chassis frame for supplying motive fluid to said fluid motors and to the cylinder and plunger assembly, and an internal combustion engine mounted on the chassis frame and operatively connected to the pump in driving relationship.

References Cited

UNITED STATES PATENTS

| | | | |
|---|---|---|---|
| 781,568 | 1/1905 | Stevens | 61—72.6 |
| 1,770,467 | 7/1930 | Fisch | 299—26 |
| 2,206,264 | 7/1940 | Rose | 299—38 X |
| 2,949,871 | 8/1960 | Finn | 172—699 X |
| 3,222,876 | 12/1965 | Harmstorf | 61—72.6 X |
| 3,256,695 | 6/1966 | Bodine | 61—72.6 |

FOREIGN PATENTS 767,411  7/1934  France.

ERNEST R. PURSER, *Primary Examiner.*